(12) United States Patent
Malik et al.

(10) Patent No.: US 9,441,142 B2
(45) Date of Patent: Sep. 13, 2016

(54) HYDROPHILIC ADHESIVES AND TAPES AND DEVICES CONTAINING THE SAME

(71) Applicant: ADHESIVES RESEARCH, INC., Glen Rock, PA (US)

(72) Inventors: Ranjit Malik, York, PA (US); Kevin McKinney, Glen Rock, PA (US); William C. Baer, Harrisburg, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 0 days.

(21) Appl. No.: 14/221,367

(22) Filed: Mar. 21, 2014

(65) Prior Publication Data
US 2014/0287181 A1 Sep. 25, 2014

Related U.S. Application Data

(60) Provisional application No. 61/819,061, filed on May 3, 2013, provisional application No. 61/804,422, filed on Mar. 22, 2013.

(51) Int. Cl.
*C09J 7/02* (2006.01)
*C09J 133/14* (2006.01)
*C09J 133/06* (2006.01)

(52) U.S. Cl.
CPC .............. *C09J 7/0217* (2013.01); *C09J 7/0203* (2013.01); *C09J 133/066* (2013.01); *C09J 133/14* (2013.01); *Y10T 137/8593* (2015.04); *Y10T 428/1476* (2015.01); *Y10T 428/2813* (2015.01)

(58) Field of Classification Search
None
See application file for complete search history.

(56) References Cited

U.S. PATENT DOCUMENTS

| 4,077,926 A | 3/1978 | Sanderson et al. |
| 6,288,149 B1 * | 9/2001 | Kroll ...................... A61L 15/58 524/292 |
| 2010/0092768 A1 | 4/2010 | Neubert et al. |

FOREIGN PATENT DOCUMENTS

| JP | 2002294193 | 10/2002 |
| WO | 02/085185 A2 | 10/2002 |
| WO | 02085185 | 10/2002 |
| WO | 2007138108 | 12/2007 |

OTHER PUBLICATIONS

Database WPI, Week 200327, Thomson Scientific, London, GB; AN 2003-270794, XP-002726913 & JP 2002 294193 A, Oct. 9, 2002.

* cited by examiner

*Primary Examiner* — Vu A Nguyen
(74) *Attorney, Agent, or Firm* — McNees Wallace & Nurick LLC (57) ABSTRACT

Hydrophilic adhesive compositions are disclosed that contain a surfactant that is miscible, but not fully soluble in the polymer matrix of the adhesive. This permits the surfactant to continuously replenish at the surface of the adhesive as other surfactant is removed, such as when it is carried away by an aqueous sample flowing over that surface in an in-vitro diagnostic device, resulting in adhesive compositions that are inherently hydrophilic on their surfaces and do not rely on the bloom mechanism of known hydrophilic adhesives. This provides greater design options for in-vitro diagnostic device manufacturers, including the use of hydrophilic adhesive spacers in lieu of or in combination with hydrophilic top covers.

20 Claims, 3 Drawing Sheets

HYDROPHILIC ADHESIVES AND TAPES AND DEVICES CONTAINING THE SAME

CROSS-REFERENCE TO RELATED APPLICATIONS

This application claims priority to and the benefit of U.S. Provisional Application No. 61/804,422, filed Mar. 22, 2013, and 61/819,061, filed May 3, 2013, both of which are hereby incorporated by reference in their entirety.

FIELD

This invention is directed to novel hydrophilic adhesives and related constructions such as those for in-vitro medical diagnostic test devices.

BACKGROUND

In diagnostics, aqueous fluids, including biological fluids such as whole blood, plasma, nasal secretion, sputum, saliva, urine, sweat, and cerebrospinal fluids, are routinely analyzed for specific components that are clinically important for monitoring and diagnosis.

In-vitro diagnostic devices are used in various settings including hospitals, clinics, alternative care sites, and in the home. These devices have been developed by various manufacturers to enable clinical professionals and non-professionals to make accurate decisions for the diagnosis and management of certain conditions. Such point-of-care devices are often used to analyze blood chemistry such as electrolytes and pH. For example, diabetics routinely use diagnostic test strips to monitor blood glucose concentrations and bacterial contamination in food and water is tested by regulatory environmental and other agencies, while chemical contamination of water sources is of interest to environmental and water supply companies.

Manufacturers of in-vitro diagnostic devices strive toward three important goals: to reduce the amount of fluid required for the test, to reduce the time needed for the test, and to improve the accuracy of the device. The hydrophilic components of the test device play a crucial role in achieving these goals. These test devices typically contain microfluidic capillary channels that allow for the transport of biological fluid from a sample inlet port to a detection zone of the device. Typically, the specimen is deposited at an inlet port of the test strip and the sample fluid is drawn into the device mechanically or by capillary flow. For capillary action to occur, the walls of the channel should reliably demonstrate hydrophilic characteristics and capillaries forming the microfluidic channels should spontaneously fill in a rapid and consistent manner when in contact with the sample fluid. The fluid should flow consistently, wetting the entire analysis zone without stalling during transit through the channels.

A hydrophilic film is typically used as a top cover, with spacers constructed of a non-hydrophilic pressure sensitive adhesive or heat seal. Additionally, many tests are designed on rigid PMMA, glass or COC cards which channels machine cut that would require a hydrophilic top seal to enclose the channels and provide the hydrophilic flow capabilities.

WO 2002/085185 describes the use of certain hydrophilic adhesives in combination with or which can replace hydrophilic films in some diagnostic device constructions. These hydrophilic adhesives serve to provide the combined advantage of reducing the surface tension of the analyte to promote wicking while also adhering components of the device together.

The adhesives and devices of the '185 publication are useful, but the art would benefit from continuing improvements. In particular, certain constructions of diagnostic devices have been disfavored because known hydrophilic technologies relied on an incompatibility of surface active agent and polymer matrix of the adhesive to achieve hydrophilicity. While this provided the desired result, it results in blooming of the surface active agent to the surface of the adhesive, which ultimately reduces the consistency of the hydrophilic properties when used in certain constructions.

These and other drawbacks are present in the current art.

SUMMARY

Exemplary embodiments are directed to surfactant containing adhesive compositions that are inherently hydrophilic on their surfaces and thus do not rely on the bloom mechanism of known hydrophilic adhesives. This provides greater design options for in-vitro diagnostic device manufacturers, including the use of hydrophilic adhesive spacers in lieu of or in combination with hydrophilic top covers. Exemplary embodiments result at least in part from the surprising and unexpected discovery that contact angle, a common measure of hydrophilicity, poorly predicts fill time, a premise on which much of the prior art surrounding such devices was predicated.

In one embodiment, an adhesive composition comprises a hydrophobic pressure sensitive or heat activated adhesive polymer matrix and a surfactant that is miscible but not fully soluble in the polymer matrix, the presence of the surfactant rendering the adhesive composition hydrophilic. By "miscible but not fully soluble" is meant that the surfactant is not insoluble (and thus does not exhibit bloom as seen in prior art adhesives employing insoluble surfactants) but also not fully soluble in the polymer matrix such the surfactant is capable of mobility within and away from the polymer matrix. This mobility permits the surfactant to continuously replenish at the surface of the adhesive as other surfactant is removed, such as when it is carried away by an aqueous sample flowing over that surface in an in-vitro diagnostic device.

In some embodiments, the adhesive composition is provided on a carrier layer in the form of a single or double sided tape. In other embodiments, the tape is used to construct a diagnostic device including both lateral flow and microfluidic devices. The tape can be used as or part of a base of the device, a top cover of the device, as a spacer, or any other area of the device having a surface that forms part of the fluid flow path of the device.

In another embodiment, a hydrophilic adhesive composition comprises an acrylic pressure sensitive adhesive polymer matrix containing up to 5% by weight solids of an ethoxylated polydimethylsiloxane surfactant.

In another embodiment, a hydrophilic adhesive composition comprises an acrylic heat activated adhesive polymer matrix containing up to 5% by weight solids of an ethoxylated polydimethylsiloxane surfactant.

An advantage of exemplary embodiments is that microfluidic devices are achieved that have benefits not previously achieved by known devices.

One advantage of exemplary embodiments is the ability to tailor hydrophilicity to control fill time in an in-vitro diagnostic device.

Another advantage of exemplary embodiments is the achievement of cover and spacer material that is inherently hydrophilic.

Yet another advantage of exemplary embodiments is the achievement of a spacer material for forming the walls of the capillary which in turn provides enough hydrophilic character to the capillary that the need for a hydrophilic top sheet substrate can be eliminated or a non-hydrophilic top sheet substrate can be used.

Still another advantage of exemplary embodiments is the construction of a microfluidic device that provides uniform wetting and wicking, ease of manufacturing, improves and simplifies manufacturing, improves device reliability, and reduces cost of the final device.

Another advantage of exemplary embodiments is the construction of a lateral flow device that provides uniform wetting and wicking, ease of manufacturing, improves and simplifies manufacturing, improves device reliability, and reduces cost of the final device.

Yet another advantage achieved with the adhesives of exemplary embodiments is the ability to increase the available area within the fluid channel for electrodes, reagents, or components of the diagnostic test device.

These and other features and advantages of the present invention will be apparent from the following more detailed description of exemplary embodiments that illustrate, by way of example, the principles of the invention.

DETAILED DESCRIPTION OF EXEMPLARY EMBODIMENTS

The present invention is directed to hydrophilic adhesives, tapes or films made of the same, and their use in in-vitro diagnostic devices. For example, the hydrophilic component of a device can be a cover or spacer that comprises hydrophilic heat seal or pressure sensitive adhesive tapes in accordance with exemplary embodiments.

Heat seals and pressure sensitive adhesive tapes facilitate device manufacturing and are integral to device performance. The combination of a pressure sensitive or heat seal adhesive with hydrophilic properties to aid in the flow of aqueous-based fluids is beneficial to device manufacturers. Benefits in providing hydrophilic adhesives with tailorable hydrophilicity, and thus controllable fill time, includes increased flexibility in device design, improvement in accuracy of the device, improvement in the consistency of the device, potentially reducing the amount of fluid required for the test, and reducing the time needed for the test.

Exemplary embodiments of the present invention provide adhesive coatings with controllable hydrophilicity to reduce the surface tension differential between the fluid and the material of the capillary to enhance the flow of aqueous-based fluids in microfluidic devices, provide hydrophilic adhesive systems suitable to be used as spacers and covers, the spacers and covers capable of forming adhesive bonds with the various components of the device thereby facilitating a more efficient manufacturing process for production of the device, increase the transfer rate of sample fluid from inlet port to distal reagents and therefore reduce the time for analysis, enable smaller sample volumes by enabling more efficient transport of fluid to a sensing reagent, and reduce the risk of chemical interference by using chemistries that are compatible with the performance of the device.

Figure 1:
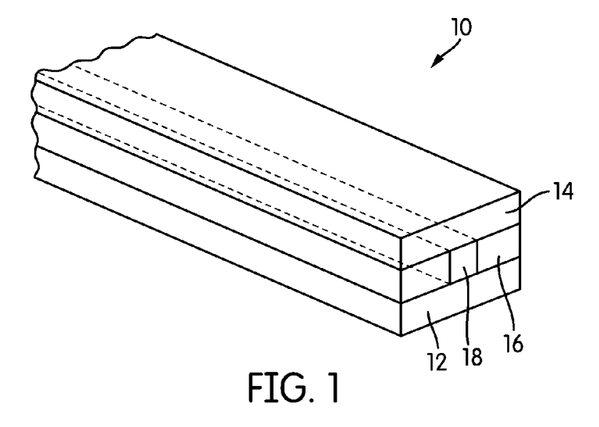
FIG. 1 schematically illustrates a diagnostic device in accordance with an exemplary embodiment.

FIG. 1 schematically illustrates an in-vitro diagnostic device 10, the general construction of which is generally known to those of ordinary skill in the art for use in the assaying of biological and other aqueous samples. The device 10 includes a substrate 12 and top cover 14 separated by spacers 16 to form at least one rectangular capillary 18. The channels are enclosed on the top with cover material to form capillaries. In some exemplary embodiments, the spacers 16 are hydrophilic pressure sensitive or heat activated tape used to form the capillary 18 as well as to secure the substrate 12 to the top cover 14. It will be appreciated that while the spacers 16 can be two separate pieces, it is more typically provided as a single spacer tape 16 that has been cut or etched to form the walls of the capillary 18. The spacer tape 16 also provides a tight seal against leakage of the fluid.

Typically, the device 10 includes multiple capillaries that serve to transport the sample from a receiving portion of the device to a collection portion. Typically, the specimen fluid is deposited at an inlet port of a test strip and the sample fluid is drawn into the device by either mechanical means or by capillary flow action. For capillary action to occur, the surface of the channel should reliably demonstrate hydrophilic characteristics. The capillaries forming the microfluidic channels should spontaneously fill in a rapid and consistent manner when in contact with the sample fluid. The fluid should flow consistently, wetting the entire analysis zone without unintended stalling during transit through the channels.

Hydrophilic adhesives in accordance with exemplary embodiments are used in construction of the devices and may be used as one or more of the base 12, top cover 14, and/or, advantageously achieved with exemplary embodiments, as a spacer tape 16.

It will be appreciated that the device in FIG. 1 is shown schematically and that various types of capillary flow and other diagnostic devices are known, some of which are subsequently discussed in greater detail by way of example, although the principles of the invention are not so limited.

Hydrophilic adhesives according to exemplary embodiments may be formulated to be thermally bonded (i.e. a heat activated adhesive) or be bonded by application of pressure (i.e., a pressure sensitive adhesive). The hydrophilicity of the surface—or edge in the case of its use as a spacer tape 16—of the adhesive is controllable through the chemical structure, concentration and distribution of the surfactant in the adhesive coating. The hydrophilic properties reduce the surface tension of aqueous fluids (e.g., water, blood, urine, sputum), thus allowing the rapid transfer of liquid from inlet area to a remote area in the device.

Adhesives are typically hydrophobic polymers with a surface energy ranging from 30-40 dynes-cm$^{-1}$. An approach to increase the flow properties of in-vitro diagnostic devices is to increase the surface energy of the hydrophobic adhesive. Two approaches can be used to improve the flow of biological fluids through a diagnostic device.

One approach is to increase the surface energy of the substrate with various surface treatments. A second approach is to reduce the surface tension of the biological fluid.

Hydrophilic adhesive tapes formulated in accordance with exemplary embodiments mix surfactants with a polymer resin to enhance the wicking of aqueous-based fluids into or through a diagnostic device. Polymer resins may be selected from film forming polymers with a suitable glass transition temperature to form heat seal coatings. In addition, resins typically used as pressure sensitive adhesives may be formulated with surfactants to provide hydrophilic pressure sensitive adhesives. These constructions are dual functional in that they serve to bond the components of the diagnostic device 10 together and also to create high surface energy surfaces which reduce the surface tension of the fluid. The reduced surface tension of the fluid allows rapid transfer of the fluid from an inlet area to a remote reagent area in the device. The rapid fluid spreading can reduce the time needed for analysis. Since a small sample volume is required due to effective fluid wicking, and fewer components of construction are needed, the device design flexibility is enhanced. This permits more efficient manufacturing processing with the potential for reduced product cost.

While fluid flow is an important aspect of hydrophilic products, the adhesive performance of the hydrophilic heat seal and pressure sensitive adhesives must be sufficiently strong to withstand the forces of assembly and cutting operations. The seal of the capillary channels should not be compromised to prevent leakage within the test device. The higher the adhesive bond strength, the better the ability of the device to maintain a seal; however, the hydrophilic performance could be compromised.

Solubility parameter is a tool commonly used to select solvents and to predict the compatibility of polymers, chemical resistance, and permeation rates. Solubility parameter was used to understand the relationship between surfactants and adhesive polymers. An evaluation of the solubility parameters of the surfactant and adhesive polymer used by hydrophilic adhesives of prior art indicate that the adhesives rely on an incompatibility of surfactant and polymer which result in the surfactant blooming to the surface of the coating during the adhesive tape manufacturing process. Performing sequential surfactant-water extractions on the surface of such known adhesive tapes confirm blooming, as a large level of surfactant is washed from the surface initially, but no additional surfactant is removed with subsequent extractions.

The effect of surfactants in adhesives was studied to determine their effect on wettability, fluid flow rate and adhesive properties. Surfactants were formulated into a base adhesive at different concentrations and the water contact angle was measured to determine the effect of surfactant on reducing the surface tension of the water.

Separately, hydrophilic heat seal and pressure sensitive adhesive tapes were prepared by dissolving the same polymeric resins in organic solvents and further formulated with tackifiers, plasticizers, antioxidants, along with surfactant. The formulated solutions were cast on PET film substrate and the solvent evaporated to yield the final adhesive tape.

The hydrophilic coatings were tested for surface wetting using de-ionized water. The sessile drop method was employed to measure the contact angle liquid water made with the surface of the hydrophilic thin film. A Rame Hart contact angle goniometer was used.

Samples of the hydrophilic pressure sensitive and hydrophilic heat seal adhesive substrates were tested for peel adhesion to stainless steel panels. Testing was performed on a MTS Alliance RT/1 mechanical tester equipped with a 225-lb load cell and hydraulic grips.

Contact angle has traditionally characterized the hydrophilic character of materials used in in-vitro diagnostic devices. While contact angle is a good indication of the hydrophilic character, the inventors surprisingly determined that it poorly predicts the more important property of fill time.

A microfluidic channel, measuring 5.08 cm×250 µm×1 mm, was fabricated from polyester film and the hydrophilic tapes consistent with the construction of FIG. 1. The capillary design was constructed using the hydrophilic adhesive as a cover material (i.e., top cover 12) and plain PET as the spacer material (i.e. spacer 16) of the capillary 18. In another construction, capillary design was constructed using the hydrophilic adhesive as the spacer tape 16 and plain PET as the top cover 12 to form the capillary 18, in which the cut edges of the hydrophilic spacer tape 16 located on the sides of the channel were the only hydrophilic element of the capillary. The effect of the hydrophilic adhesives on the flow rate of distilled water in a microfluidic channel was measured.

Figure 2:
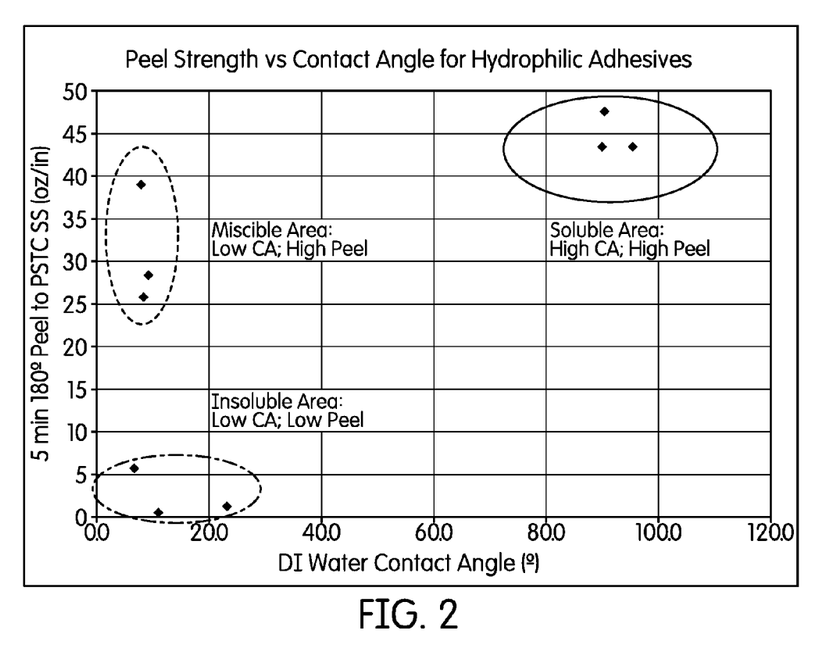
FIG. 2 graphically illustrates peel strength versus contact angle for hydrophilic adhesives.

The inventors surprisingly discovered that both contact angle and fluid flow rate could be reduced and adhesion levels could be maximized when the both the polar head group and non-polar tail group of the surfactant molecule were only marginally soluble (i.e., miscible) in the adhesive polymer matrix as shown in FIG. 2. Polymers in which the surfactant was fully soluble in the matrix resulted in adhesives with high adhesion forces, but also high contact angles and limited fluid flow properties. Polymers in which the surfactant was insoluble in the matrix resulted in adhesives with low contact angles and high fluid flow rates, but reduced adhesion forces due to the bloom of surfactant. When the surfactant and polymer are tailored so that the solubility of the surfactant is marginal, a balance was achieved such that the resulting adhesive system has both high adhesion forces but also low contact angle and high fluid flow rates.

Figure 3:
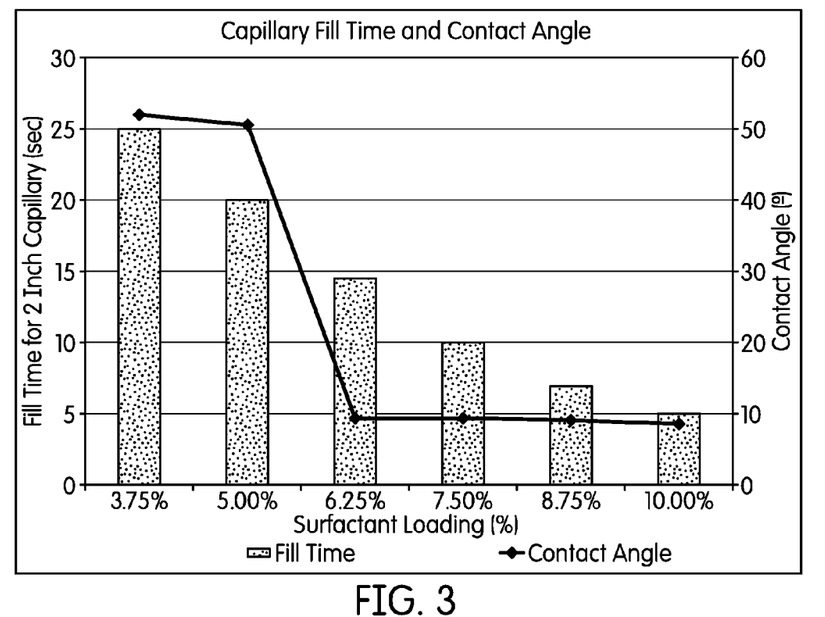
FIG. 3 graphically illustrates capillary fill time and contact angle with respect to increasing surfactant loading.

Thus, the inventors also surprisingly discovered the presence of low contact angle alone is not indicative of fill time. The use of a surface active agent that is marginally soluble in the polymer matrix allows for the fill time to be tailored in a controllable manner while still achieving low contact angle. FIG. 3 illustrates the discovery that that fill time responds in a linear manner while contact angle drops suddenly and then levels out; that is, there is not a correlation between contact angle and fill time; FIG. 3 is illustrative of the discovery and was generated using an adhesive composition employing an acrylic co-polymer of 52% methoxyethyl acrylate, 18.5% methyl acrylate, 18.5% ethyl acrylate, 10% butyl acrylate, and 1% acrylic acid, all by weight, in combination with a non-ionic, ethoxylated, acetylenic diol surfactant commercially available as Dynol 604 from Air Products.

The ability to control fill time has additional advantages as some diagnostic devices do not require fast fill times, but instead strive to achieve a precise control over fill time. A controllable fill time is accomplished through tailoring the hydrophilic character of the adhesives. Thus, the ability to control fill time, including intentionally increasing the fill time in some circumstances, opens up the possibility for designers to incorporate more complex, sequential reactions to occur in in-vitro diagnostic devices.

Quantification of the amount of surfactant removed from the surface of the adhesive when rinsed with de-ionized water was determined via High Performance Liquid Chromatography (HPLC). Samples of the hydrophilic adhesive tapes were cut to five square inches, and rinsed with two milliliters of water for period of one minute. The extract was then analyzed via HPLC for surfactant concentration. Subsequent extractions were performed on the same five square inch sample for a period of one minute each using two milliliters of water to quantify the amount of surfactant that could be removed over time.

Figure 4:
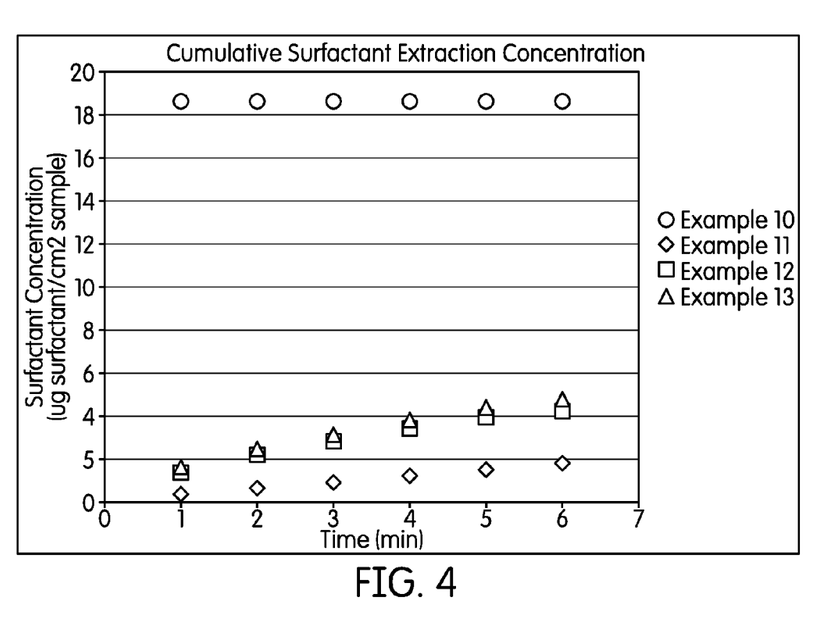
FIG. 4 graphically illustrates cumulative surfactant extraction concentration.

A novel feature of the present invention is that as surfactant is washed from the surface of the adhesive, thermodynamics of the solubility of the surfactant drives surfactant to replenish the surface of the adhesive. In FIG. 4, it can be seen that as the surface of the adhesive is rinsed with sequential water aliquots over time, additional surfactant continues to be removed from the surface, as demonstrated by an increase in the cumulative amount of surfactant extracted.

The polymer matrix used to form the hydrophilic heat activated or pressure sensitive adhesives in accordance with exemplary embodiments include any of a variety of known resins used for forming conventional hydrophobic compositions. For heat activated adhesives, film forming polymers are typically used, as heat activated adhesives may have the additional advantage of not requiring application to a carrier layer as is typically the case for pressure sensitive adhesives.

Exemplary polymers for use in forming the matrix of exemplary embodiments include polyolefins, including but not limited to polyethylene, polystyrene, polyvinyl chloride, polyvinyl acetate, polyvinylidene chloride, polyacrylic acid, polymethacrylic acid, polymethyl methyacrylate, poly ethyl acrylate, polyacrylamide, polyacrylonitrile, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, ethylene-vinyl acetate copolymer, polycarbonate, ethylene-isobutyl acrylate copolymer, as well as random or block copolymers of two or more polyolefins or a polyolefin and non-olefin. Similarly, blends of two or more polymers may also be employed, as long as the polymer produced is hydrophobic in character.

The cover or spacer tape may also comprise of one or more layers of a polyester such as polyethylene terephthalate, polyethylene isophthalate-terephthalate, copolymers of poly(1,4-cyclohexane dimethylene)terephthalate, poly(1,4-cyclohexane dimethylene)isophthalate, and isophthalate-terephthalate copolymers; poly(1,4-phenylene)terephthalate and isophthalate and copolymers; poly(1,4-phenylene)-4,4'diphenyl dicarboxylate; polyesters derived from aliphatic dibasic acids, such as maleic, adipic and sebacic acids and polyhydroxy compounds such as polyethylene glycol, neopentyl glycol, butylene glycol, glycerol, pentaerythritol, and cellulose.

Preferably, the polymer matrix of the adhesive compositions in accordance with exemplary embodiments of the invention are acrylic base polymers or copolymers. Exemplary acrylic constituents include methyl acrylate, ethyl acrylate, propyl acrylate, butyl acrylate, hydroxyethyl acrylate (HEA), methoxyethyl acrylate, ethoxyethoxyethyl acrylate, phenoxyethyl acrylate, acrylic acid, and copolymers or blends thereof. It will further be appreciated that acrylic co-polymers may be formulated that include minor amounts of one or more non-acrylic constituents used in forming the co-polymer, such as vinyl acetate, vinyl pyrrolidone and dimethyl acrylamide, for example. Preferred acrylate-based pressure sensitive adhesives are formulated using alkyl (alkyl)acrylate esters or alkoxy (alkyl)acrylate esters polymerized using non-aromatic initiator and cross-linkers. In one preferred embodiment, the polymer matrix is an acrylic copolymer in which the major constituent is methoxyethyl acrylate.

The concentration of unreacted components such as monomers, initiators, and cross-linkers should be minimized to reduce interference. Typically, the concentration of unreacted monomers in the formulation will be in the ppm range.

Film forming polymers used in the present invention exhibit a Tg or Tc sufficient to permit the polymer to be film-forming as well as to enable the resulting polymer to be heat sealable at a sufficiently low temperature (e.g. in the range from 70 to 100° C.).

In some embodiments, it may be advantageous that the composition exhibit minimal or low fluorescence. In some embodiments, materials suitable for use in the present invention are selected because they exhibit minimal or low fluorescence and include alkyl(meth)acrylic acid esters. A low fluorescence cover or spacer tape may be provided with advantage comprised of amorphous polyolefins such as polyethylene, polypropylene or blends of polyolefins.

A variety of surfactants may be admixed with the polymer to render the surface of the polymer hydrophilic. Surfactants which are suitable for use in the present invention include any surfactant which effectively imparts hydrophilic surface properties to the hydrophobic polymer film. Any type of surfactant may be employed, provided the surfactant exhibits only marginal solubility in the polymer matrix; that is, the surfactant is miscible, but is not fully dissolved. However, it has been determined that non-ionic surfactants are preferred and in some embodiments, the surfactant is an ethoxylated polydimethylsiloxane (PDMS). It will be appreciated, however, that the particular surfactant selected may depend in some cases on the polymer matrix and the surfactant's miscibility therewith. Other suitable surfactants may include other non-ionic ethoxylated surfactants including ethoxylated secondary alcohols, ethoxylated fatty acids, and ethoxylated phenols; non-ionic acetylenic surfactants such as acetylenic diols and ethoxylated acetylenic diols; and in some embodiments an anionic surfactant may be employed, such as sodium salt of dioctylsulfo succinate, sodium salt of diphenyl oxide disulfonate, or sodium salt of laureth sulfate.

The composition may also include other constituents known in the art for adhesive formulations including cross-linkers, tackifiers, plasticizers and anti-oxidants, for example.

Initially, the hydrophobic polymer resin selected is typically admixed with a suitable solvent to form a solvated solution of the polymer in the solvent. The polymer is admixed and dissolved in the solvent under conditions which permit the polymer to be so dissolved. Such conditions may include for example, temperatures within the range of from 20 to 30° C., although higher temperatures may also be employed depending upon the selection of the particular polymer. Exemplary solvents from which such selection may be made include but are not limited to toluene, methyl ethyl ketone, xylene, ethyl acetate, tetrahydrofuran, methylene chloride, n-heptane, n-butylacetate, acetone, cellosolve acetate, methyl cellosolve, n-butanol, isopropanol, and ethanol.

Once formed, the solution of the polymer and the polymer solvent is admixed with a suitable surfactant which is only marginally soluble with the solution of the polymer and the polymer solvent. The surfactant is admixed in an amount of, for example, up to about 10% by weight, based on the total weight of the polymer and surfactant, typically with a solids ratio of surfactant to polymer ranging from 1:99 to 10:90.

Preferably the surfactant is admixed with the polymer in an amount in the range of from about 3 to 6% by weight and in one embodiment the ratio is about 95% by weight resin and about 5% by weight surfactant, all on a solids basis.

Once the mixture of polymer, solvent and surfactant (and any other ingredients in the formulation) is formed, the mixture is cast onto a carrier (typical in the case of a PSA) or otherwise caused to be formed into a film (typical in the case of a heat activated adhesive). The solvent contained in the composition is removed from the film by the application of heat or other means (such as by reduced pressure).

When the cover or spacer layer comprises a pressure sensitive adhesive, it is preferable to use at least one release liner to protect the adhesive surface. If a liner is used, it is desirable that there is no transfer of compounds from the liner to the sealing surface which will interfere with the separation of biomaterials.

Figure 5:
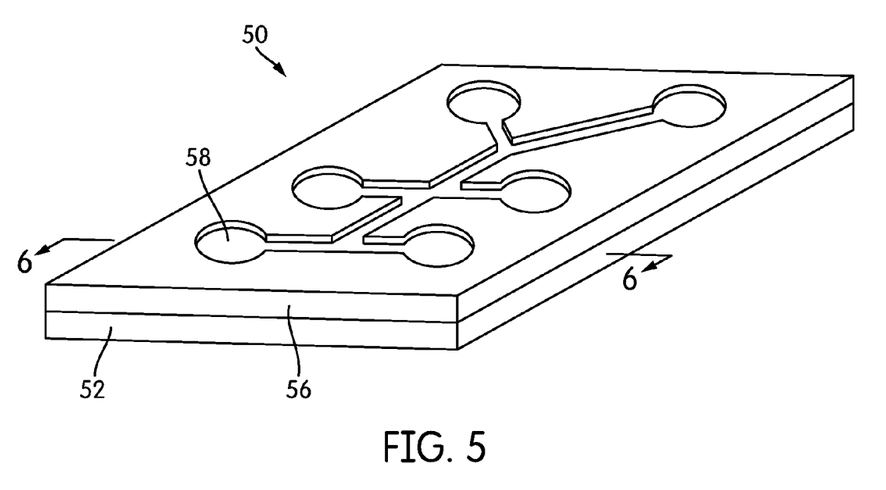
FIG. 5 illustrates a microfluidic device in accordance with an exemplary embodiment.
Figure 6:
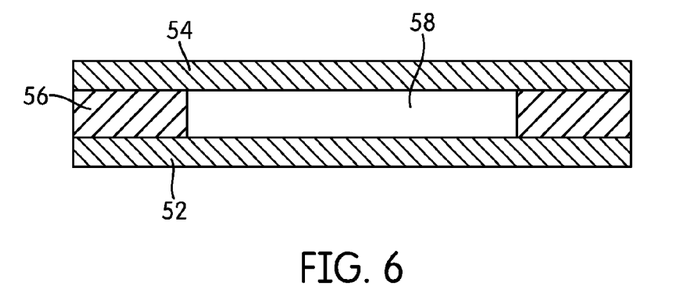
FIG. 6 illustrates a cross-sectional view of a portion of FIG. 5.

As described more generally with respect to FIG. 1, hydrophilic adhesive tapes and films formed in accordance with embodiments of the present invention can be employed with a variety of microfluidic devices of the capillary flow type. In the context of a microfluidic diagnostic device which employs capillary transport of the fluid sample during the analysis procedure, such devices may include microfluidic channels molded in a suitable polymeric substrate as seen in FIGS. 5 and 6. Microfluidic device generally refers to a device having one or more fluid channels, passages, chambers, or conduits which have at least one internal cross-sectional dimension (width or depth) of between 0.1 μm and 500 mm within which a fluid sample passes from an inlet port to a detection zone. Another technique to form channels includes the steps of laminating a heat seal or pressure sensitive adhesive tape on a substrate, also called the base portion, followed by etching out channels in the adhesive layer of the laminate. One advantage of such a construction is that the microfluidic device may be constructed easily without the need to mold the fluid channels into the base layers as in the embodiment of FIG. 6. The etching process may be performed using conventional microfabrication techniques known to those skilled in the art, including but not limited to photolithography, wet chemical etching, laser ablation, air abrasion techniques, injection molding, embossing, die-cutting and other techniques.

Yet another technique to form channels is to pre-cut channels in the adhesive tape prior to its lamination to the substrate. The heat activated or pressure sensitive adhesive tape can be in the form of a transfer tape, single sided tape, or double sided tape. The heat activated tape requires the application of heat to perform the lamination whereas the pressure sensitive tape requires application of pressure to perform lamination. Other means of bonding can also be employed such as acoustic welding techniques, UV curable adhesive, etc.

The microfluidic diagnostic device is generally comprised of a substantially planar base portion having one or more microfluidic channels, passages, chambers or conduits therein. A variety of materials may comprise the base portion, including polymeric materials such as polymethylmethacrylate, polycarbonate, polytetrafluoroethylene, polyvinylchloride, polydimethylsiloxane, polysulfone, and silica-based substrates such as glass, quartz, silicon and polysilicon, as well as other conventionally-employed substrate materials.

Referring again to FIG. 1, in one embodiment of the present invention, the cover 14 is applied as a tape, which may be a hydrophilic tape as described herein, enclosing the microfluidic passages or channels. The fact that the surface of the covering substrate is hydrophilic in nature enhances the flow of the liquid through the passages and channels of the device. As discussed above, the hydrophilic covering substrate can comprise a variety of types of materials having hydrophilic character such as a hydrophilic pressure sensitive adhesive layer, or a hydrophilic heat-activated layer.

In another embodiment of the present invention, the spacer tape 16 between the base portion 12 and the top cover 14 forming the walls of the capillary channels 18 is hydrophilic in character. The spacer is at least one of the surfaces of the capillary that is hydrophilic. The fact that the wall of the capillary is hydrophilic in nature enhances the flow of the liquid through the microfluidic passages and channels. As discussed above, the hydrophilic spacer can comprise a variety of types of materials have hydrophilic character such as a hydrophilic pressure sensitive adhesive layer, or a hydrophilic heat-sealable layer.

As discussed above, an alternative to otherwise having to ensure that the channels possess sufficient hydrophilicity to cause the fluid sample to travel along the capillary tube, the cover substrate or spacer tape can be inherently hydrophilic or can be formulated with surfactant or can be a combination of both. That is, the heat-activated cover or spacer adhesive having hydrophilic surface characteristics may be applied to/for the channels. As an alternative, the cover or spacer adhesive may include a pressure sensitive adhesive which is also hydrophilic in character to provide the necessary hydrophilicity to cause the fluid sample to wet the channel. The use of such materials in the construction of the microfluidic diagnostic device also serves to simplify the manufacturing of the device. In the context of the present invention, the entire wall surface of the channel need not be hydrophilic; instead only that portion of the microfluidic channels or passages may need to be hydrophilic. In some cases, the microfluidic channels or passages may be rendered less hydrophilic than other portions to modify the flow rate of the fluid sample. One method is to utilize a double sided spacer construction, in which a hydrophilic pressure sensitive or heat activated adhesive is placed on one or both sides of a polyester or other film to create a laminated spacer.

As depicted in FIGS. 5 and 6, a microfluidic in-vitro diagnostic device 50 may be comprised of opposing base layers 52, 54 separated by an adhesive spacer layer 56. While only a single base layer 52 is shown in FIG. 5 to show the fluid channels 58, both base layers 52, 54 are shown in FIG. 6. The spacer layer 56 may have fluid channels 58 provided therein within which a fluid to be assayed passes from a reservoir to a collection point. At least a portion of the surfaces of the base layers 52, 54 and the spacer layer 56 which define the boundaries of the fluid channels 58 are hydrophilic in character.

In other embodiments, the diagnostic device 50 may be of a lateral flow type device in which the fluid channel is large enough that capillary action may not be the primary driving force and/or may not be present at all, with the fluid flowing from one end of the channel to the other simply as a result of surface wetting of the hydrophilic surfaces present.

With respect to the material used in the assay platform, such material may be either flexible or rigid, but is preferable that such materials be clear and colorless; chemically compatible with electrophoretic separation; exhibit little or no fluorescence under assay detection conditions as evidenced by little or no spectral emissions in the wavelength of 400 to 800 nm; be dimensionally stable and withstand pressure during electrophoresis; and dissipate heat during electrophoresis.

EXAMPLES

The invention is further described in the context of the following examples, which are presented by way of illustration, not of limitation.

Examples 1-9

An acrylic co-polymer (50% methoxyethyl acrylate, 18.5% methyl acrylate, 18.5% ethyl acrylate, 10% butyl acrylate, and 3% HEA, all by weight) was dissolved in ethyl acetate to produce a hydrophobic adhesive composition to which different surfactants were added. In each case, the composition was then spread onto a polymer film and the solvent allowed to evaporate to produce a hydrophilic pressure sensitive adhesive coating.

Examples containing 95% by weight of the acrylic resin described along with 5% by weight surfactant were formulated for each of nine different commercially available surfactants as shown in Table 1 below, which also indicates measured contact angle and the 180° peel strength on stainless steel.

TABLE 1

| Example | Resin (wt % solids) | Surfactant (wt % solids) | Surfactant | Contact Angle (°) | 180° Peel (oz/in) |
|---|---|---|---|---|---|
| 1 | 95 | 5 | Aerosol OT (sodium salt of dioctyl-sulfosuccinate) | 7 | 6 |
| 2 | 95 | 5 | Tergitol 15-S-7 (ethoxylated secondary alcohol) | 9 | 28 |
| 3 | 95 | 5 | Silsurf A008-UP (ethoxylated PDMS) | 8 | 26 |
| 4 | 95 | 5 | Rhodapex ESB70/FEA (sodium salt of laureth sulfate) | 11 | 0.5 |
| 5 | 95 | 5 | Brij O5-LQ-(MH) (ethoxylated fatty acid) | 23 | 1 |
| 6 | 95 | 5 | Surfynol 440 (acetylenic diol) | 90 | 48 |
| 7 | 95 | 5 | Silsurf A008-AC-UP (ethoxylated PDMS) | 8 | 39 |
| 8 | 95 | 5 | Dowfax C6L (sodium salt of diphenyl oxide disulfonate) | 90 | 44 |
| 9 | 95 | 5 | Triton X45 (ethoxylated phenols) | 95 | 44 |

Example 10 (Comparative)

A comparative example known to work by the blooming mechanism employing an insoluble surfactant was formulated. A polyester resin with a glass transition temperature between −15° C. to +15° C., commercially available as Vitel 3300 and 3500 resins was dissolved in a solvent of methyl ethyl ketone and toluene (7:3 weight ratio). A commercial surfactant, Aerosol OT, available from Cytec was dissolved in the solution to provide a surfactant concentration of 5% by weight (solids basis) of the resin. A hydrophilic coating of a heat seal adhesive was formed as described with respect to Example 1.

Example 11-13

An acrylic pressure sensitive co-polymer (52% methoxyethyl acrylate, 18.5% methyl acrylate, 18.5% ethyl acrylate, 10% butyl acrylate, and 1% acrylic acid, all by weight) was dissolved in ethyl acetate. An ethoxylated polydimethylsiloxane surfactant (Silsurf A008-UP) was dissolved in the resin solution to provide a surfactant concentration of 1% (Ex. 11), 5% (Ex. 12), and 10% (Ex. 13) by weight (solids basis) of the polymer. Hydrophilic coatings were formed as described with respect to Example 1.

Sample tapes made in accordance with Examples 10-13 were measured to determine the cumulative amount of solvent extracted over time, the results of which are shown in Table 2. The results reflect that Example 10 exhibits bloom, with high initial hydrophilicity but with no cumulative increase. Conversely, Examples 11-13 all show some initial hydrophilicity, which increases at a steady rate over time. This reflects the inherent hydrophilicity of adhesive compositions formed in accordance with exemplary embodiments, which is shown graphically in FIG. 4.

TABLE 2

| | Cumulative Surfactant Extracted with Time [µg/cm$^2$] | | | |
|---|---|---|---|---|
| Time | Ex. 10 | Ex. 11 | Ex. 12 | Ex. 13 |
| 1 min | 18.6 | 0.36 | 1.32 | 1.63 |
| 2 min | 18.6 | 0.64 | 2.14 | 2.45 |
| 3 min | 18.6 | 0.92 | 2.80 | 3.14 |
| 4 min | 18.6 | 1.20 | 3.40 | 3.82 |
| 5 min | 18.6 | 1.48 | 3.91 | 4.39 |
| 6 min | 18.6 | 1.77 | 4.23 | 4.76 |

Example 14

An acrylic heat-sealable co-polymer (53% methoxyethyl acrylate, 23% methyl methacrylate, 23% methyl acrylate, 1.2% acrylic acid, all by weight) was dissolved in ethyl acetate. An ethoxylated polydimethylsiloxane surfactant (Silsurf A008-UP) was dissolved in the resin solution to provide a surfactant solids to polymer ratio of 5:95 (i.e., a surfactant concentration of 5% by weight (on solids basis) of the resin). Hydrophilic coatings were formed as in Example 1. The contact angle of de-ionized water on the surface ranged from 5 to 10 degrees and the 180 degree peel adhesion to stainless steel was measured at 10 oz/in.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising a hydrophobic polymer matrix and a surfactant, wherein the surfactant is miscible but not fully soluble in the polymer matrix, wherein the composition is a hydrophilic pressure sensitive or a hydrophilic heat activated adhesive and wherein the polymer matrix comprises methoxyethyl acrylate.

2. The composition of claim 1, wherein the composition is a hydrophilic pressure sensitive adhesive.

3. The composition of claim 1, wherein the composition is a hydrophilic heat activated adhesive.

4. The composition of claim 1, wherein the surfactant is a non-ionic surfactant.

5. The composition of claim 4, wherein the surfactant is ethoxylated polydimethylsiloxane.

6. The composition of claim 1, wherein the surfactant to polymer matrix ratio on a solids weight basis is in the range of 1:99 to 10:90.

7. The composition of claim 6, wherein the surfactant is present in the range of 3% to 6% by weight, on a solids basis, of the polymer matrix.

8. A composition comprising a hydrophobic acrylic co-polymer matrix and a surfactant, wherein the surfactant is ethoxylated polydimethylsiloxane, the ethoxylated polydimethylsiloxane being miscible but not fully soluble in the acrylic co-polymer, wherein the relative weight percentages of acrylic co-polymer to ethoxylated polydimethylsiloxane on a solids basis is 95% by weight acrylic co-polymer and 5% by weight ethoxylated polydimethylsiloxane, wherein the composition is formulated as a hydrophilic pressure sensitive or a hydrophilic heat activated adhesive and wherein the acrylic co-polymer matrix is a co-polymer comprising methoxyethyl acrylate.

9. The composition of claim 8, wherein the acrylic co-polymer matrix is a co-polymer of 50% methoxyethyl acrylate, 18.5% methyl acrylate, 18.5% ethyl acrylate, 10% butyl acrylate, and 3% HEA, all by weight.

10. The composition of claim 8, wherein the acrylic co-polymer matrix is a co-polymer of 53% methoxyethyl acrylate, 23% methyl methacrylate, 23% methyl acrylate, 1.2% acrylic acid, all by weight.

11. The composition of claim 8, wherein the acrylic co-polymer matrix is a co-polymer of 52% methoxyethyl acrylate, 18.5% methyl acrylate, 18.5% ethyl acrylate, 10% butyl acrylate, and 1% acrylic acid.

12. A tape comprising a layer of the composition of claim 1, wherein the tape exhibits surfactant replenishment at a surface of the layer.

13. The tape of claim 12, wherein the layer of the composition is supported on a carrier layer.

14. The tape of claim 13, further comprising a release liner on a side of the composition layer opposite the carrier layer.

15. The tape of claim 12, wherein the layer of the composition is a self-supporting hydrophilic heat activated adhesive film.

16. A diagnostic device comprising a fluid flow path, wherein the composition of claim 1 forms a portion of the fluid flow path.

17. The diagnostic device of claim 16, wherein the fluid flow path is an elongated channel formed by a base, a top cover, and a spacer defining opposite sides of the channel.

18. The diagnostic device of claim 17, wherein the spacer comprises the composition.

19. The diagnostic device of claim 17, wherein the top cover comprises the composition.

20. The diagnostic device of claim 16, wherein the device is a microfluidic or lateral flow device.

* * * * *